(12) United States Patent
Moench et al.

(10) Patent No.: US 7,316,483 B2
(45) Date of Patent: Jan. 8, 2008

(54) METHOD OF REPRESENTING A VIDEO IMAGE BY MEANS OF A PROJECTOR

(75) Inventors: Holger Moench, Vaals (NL); Carsten Deppe, Aachen (DE); Xaver Riederer, Aachen (DE); Eelco Gerben Visser, Best (NL); Nicolaas Hubertina Gerardus Reijnders, Wijchen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 177 days.

(21) Appl. No.: 10/542,150

(22) PCT Filed: Dec. 22, 2003

(86) PCT No.: PCT/IB03/06329

§ 371 (c)(1),
(2), (4) Date: Jul. 12, 2005

(87) PCT Pub. No.: WO2004/064409

PCT Pub. Date: Jul. 29, 2004

(65) Prior Publication Data

US 2006/0050246 A1    Mar. 9, 2006

(30) Foreign Application Priority Data

Jan. 15, 2003    (EP) .................................. 03100065

(51) Int. Cl.
*G03B 21/14*    (2006.01)

(52) U.S. Cl. ......................................... 353/85; 315/291

(58) Field of Classification Search .................. 353/85; 345/52, 53, 54; 315/291

See application file for complete search history.

(56) References Cited

U.S. PATENT DOCUMENTS

| | | | | |
|---|---|---|---|---|
| 5,926,297 | A  * | 7/1999 | Ishikawa et al. | 398/43 |
| 6,016,037 | A  * | 1/2000 | Kuribayashi et al. | 315/169.3 |
| 6,278,244 | B1 * | 8/2001 | Hevinga et al. | 315/291 |
| 6,437,518 | B1 * | 8/2002 | Ito et al. | 315/290 |
| 7,122,960 | B2 * | 10/2006 | Tukamoto et al. | 313/576 |
| 2002/0117968 | A1* | 8/2002 | Derra et al. | 315/56 |
| 2002/0190665 | A1* | 12/2002 | Sun | 315/224 |
| 2003/0160577 | A1* | 8/2003 | Noguchi et al. | 315/291 |
| 2005/0151482 | A1* | 7/2005 | Riederer et al. | 315/291 |

FOREIGN PATENT DOCUMENTS

DE    694 24 858 T2    12/2000
EP    1 154 652 A2    11/2001

* cited by examiner

*Primary Examiner*—William C. Dowling

(57) ABSTRACT

The invention relates to a method of representing a video image based on a video signal by means of a projector which comprises an image display device and a high-pressure gas discharge lamp, which lamp is supplied with a square-wave alternating current (I0, I10) on which a current pulse (P1, P3, P10, P40) is superimposed before each phase reversal. According to the invention, the alternating current (I0, I10) is superimposed with a second current pulse (P2, P4, P20, P30, P50, P60) of the same polarity. A simple attunement of the alternating current frequency to the image frequency without image artifacts is made possible by the second pulses (P2, P4, P20, P30, P50, P60).

20 Claims, 1 Drawing Sheet

METHOD OF REPRESENTING A VIDEO IMAGE BY MEANS OF A PROJECTOR

Figure 1:
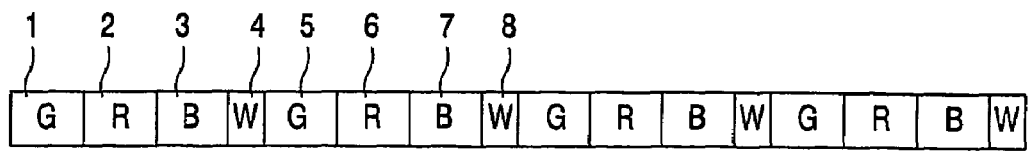
Figure 1:
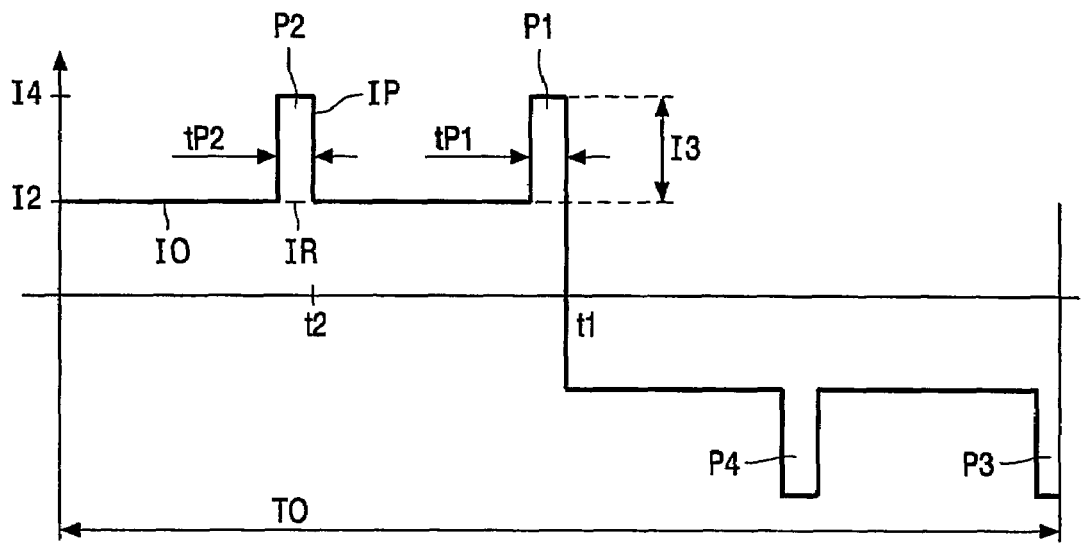

The invention relates to a method of representing a video image based on a video signal by means of a projector which comprises an image display device and a high-pressure gas discharge lamp, which lamp is supplied with a square-wave alternating current on which a current pulse is superimposed before each phase reversal.

Projectors with such an image display device, referred to as a light valve and an array, are known from DE 694 24 858 T2 and EP 1154652. The construction principle is explained in detail.

It is known from EP 11 52 645 A1 how a high-pressure gas discharge lamp is operated with a square-wave alternating current for such a projector. The alternating current is superimposed with a current pulse of the same polarity before the phase reversal at the end of each half cycle of the lamp current, i.e. before a polarity change. This avoids leaping of a luminous discharge arc and flickering of the image. This current change has the result, however, that the lamp is now operated with an alternating lamp current which comprises pulsatory components, increasing the luminous intensity in a corresponding pulsatory manner. The frequency of the alternating current is indicated as being an operating frequency sequence of 45, 65, 90, and 130 Hz. It is already taken into account with these values that the operating frequency influences lamp life, and that lamp life will only be long if a lamp frequency of 30 to 200 Hz can be adjusted.

It is known from U.S. Pat. No. 6,278,244 to synchronize a square-wave alternating current comprising such a pulse for operating a high-pressure gas discharge lamp with a video signal.

Given a video frequency of 60 Hz and a lamp frequency of 90 Hz, a color wheel can be rotated with such an angular speed that a video image based on a video signal can be represented three times in a color sequence of the colors red, green, blue, and white, and the current pulse coincides with the color white each time in the display of the image. The operating frequency of the lamp and the video frequency are mutually so attuned that the raised intensity of the light has no influence on the colors of the image, and a neutral color impression is safeguarded. A device with these characteristics is manufactured under the name M3 by the company of InFocus ASA of Fredrikstad, Norway, and is commercially available. Partial images, however, are still visible in the case of moving pictures. To avoid unpleasant artifacts caused by a sequential color representation, it is desirable to increase a color changing frequency. An increase in the frequency however, leads to a movement of the light pulse over individual color segments. The movement of the light pulse leads to color shifts. A frequency increase of the alternating current leads to a shorter lamp life expectancy.

The invention accordingly has for its object to avoid color shifts and other image artifacts. In addition, the life expectancy of the lamp should be long.

This object is achieved by the characterizing features of claim 1. According to the invention, a second current pulse of the same polarity is superimposed on the alternating current. This additional pulse is generated within each half cycle and has no influence on lamp life. The pulse can be generated by a simple modification in the control by the lamp driver. The second pulse renders possible a simple attunement between the lamp frequency and the image frequency without image artifacts.

Advantageously, the current pulse occurs periodically. This achieves a light distribution corresponding to that in a lamp operation of double frequency. The commutation, however, still takes place at a low frequency, and lamp life remains the same because of the lower frequency.

Advantageously, the current pulse takes place aperiodically. The second current pulse thus takes place at different moments in time within the half cycle of the alternating current. The moment may be changed either in a random manner or in a given sequence. The advantage now is that the time between mutually adjoining light intensifications is not laid down, but is variable. This implies that possible artifacts are not present in fixed positions on the screen, but can be averaged out. This is interesting for color wheels with spiraling color segments. These segments generate horizontal color beams which run vertically downward over the screen. All three colors are present on the screen at the same time, but in different locations, see Dewald, Pa., Davis: "Sequential Color Recapture and Dynamic Filtering: A Method of Scrolling Color" in SID 01 Digest of Technical Papers, vol. XXXII, pp. 1076 to 1079, 2001, and Shimizu: "Scrolling Color LCOS for HDTV Rear Projection" in SID 01 Digest of Technical Papers, vol. XXXII, pp. 1072 to 1075, 2001.

Advantageously, the second current pulse has the same contour as the current pulse just before the phase reversal. A simple implementation is possible when a pulse is used with the same contours as the pulse before the phase reversal.

Advantageously, the current pulse has a pulse duration that can be varied. The second pulse can thus be attuned to the image display device, in particular to a reflecting image display device. Overall, an exact pulse sequence can be optimized with respect to the address schedule of the individual image display device.

Advantageously, the current pulse has an amplitude that can be varied. This renders possible a still more accurate adaptation to the requirements of the image display. An adjustment of moment, amplitude, and duration provides a possibility of setting parameters dynamically, i.e. parameters can be adapted in dependence on lamp age, image contents to be displayed, or a chosen basic setting of the projection system. To achieve a color temperature and color neutrality in a projector that have been set, the first current pulses will occur in one of the color segments, for example red. The further current pulses will lie in other color segments and are adapted as regards their amplitude and duration.

Advantageously, the current pulse lies within a time period which is given by the final 80% of the total duration of a half cycle. In this manner the lamp electrodes, and thus lamp life, remain unaffected.

Advantageously, the alternating current is synchronized with the video signal. The pulses can thus be attuned to the colors of the color sequence.

Advantageously, the current pulse occurs during a white segment. Color distortions are avoided thereby, and a natural color representation can be achieved.

Advantageously, the current pulse occurs during a color transition. Mixed colors are intensified thereby, together generating a white color, brightening up the image, and thus averaging each other out.

Advantageously, the frequency of the alternating current can be varied. A wide range of time intervals between consecutive light intensifications can be generated thereby, and all periodic effects are lost. An application with additional pulses has the advantage of generating pulse repetitions at a higher frequency which average out artifacts without low-frequency visible effects, while at the same time retaining the lamp operation at an optimized low frequency.

Figure 2:
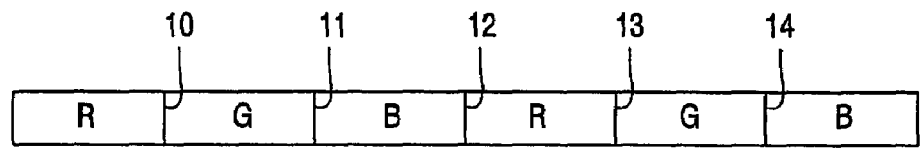
Figure 2:
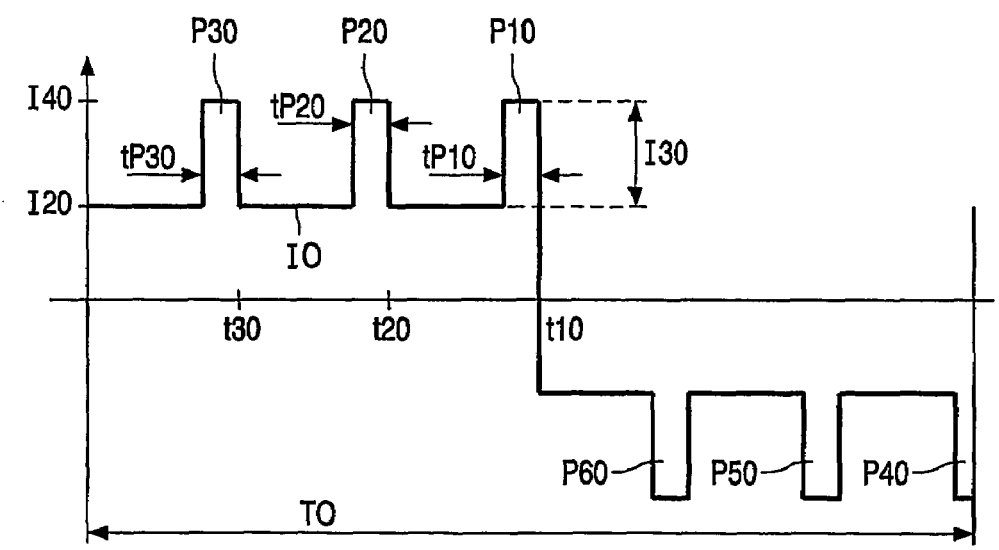

Embodiments will be explained in more detail below for a better understanding of the invention, with reference to the drawing, in which:

FIG. 1 is a time diagram of one cycle of an alternating lamp current with four pulses and a color sequence with the colors green, red, blue, and white, and FIG. 2 is a time diagram of one cycle of an alternating lamp current with six pulses and a color sequence with the colors red, green, and blue.

FIG. 1 is a time diagram with a square-wave pulsatory alternating current I0 whose cycle has a duration of T0. The square-wave pulsatory alternating current I0 is composed of a square-wave alternating current IR and a pulsatory current IP. T0 is equal to 16 ms or a video frequency of 60 Hz as used in NTSC video systems. A first pulse P1 ends at moment t1, i.e. after a half cycle before a phase reversal. The square-wave pulsatory alternating current I0 comprises a second pulse P2 which ends at moment t2, i.e. after a quarter of a cycle. The amplitude of the square-wave alternating current IR is denoted I2. The pulses P1 and P2 are components of the pulsatory current IP, have pulse durations of tP1 and tP2, an amplitude I3, and the same contour. When the alternating current IR and the pulsatory current IP are superimposed, having the same polarity, the result is the pulsatory square-wave alternating current I0 whose highest amplitude is I4. A total of four pulses P1, P2, P3, and P4 occur in every cycle.

A color wheel with two segments for each of the colors green, red, blue, and white, i.e. a total of eight segments 1 to 8, rotates during an alternating current cycle, equal colors being mutually diametrically opposed.

A video image transmitted at 60 Hz is displayed four times, which corresponds to an image repetition rate of 4 or an image frequency of 240 Hz, the repeated images also being referred to as sub-frames. The lamp frequency can then be set for 60 Hz. Lamp life is long if a lamp frequency of 30 to 200 Hz, advantageously 60 to 120 Hz, in particular 90 Hz can be adjusted. The pulses P1 to P4 occur during the white segments 4 and 8.

FIG. 2 shows a square-wave alternating lamp current I10 with an amplitude I20 and with a total of six pulses P10, P20, P30, P40, P50, and P60 with an amplitude I30. The pulses P10, P20, P30, P40, P50, and P60 are spaced apart by one sixth of the lamp cycle T10 and end at the moments t10, t20, t30, t40, t50, and t60, i.e. after one sixth, one third, one half, two thirds, five sixths, and one full period. The duration of the pulses is the same each time and is denoted tP10, tP20, tP30, tP40, tP50, and tP60. The pulses P10, P20, P30, P40, P50, and P60 have the same contours. The pulses P10 and P40 before a phase reversal are denoted anti-flicker pulses, the other pulses P20, P30, P50, and P60 are denoted phantom pulses.

A color wheel uses the colors red, green, and blue without a white segment. Mixed colors still occur, however, upon each change to the next color during a short period owing to a width of a light ray passing through the color wheel. These mixed colors, when summed together, generate white again. It is desirable, therefore, always to use a pulse P10, P20, P30, P40, P50, and P60 at each color change 10, 11, 12, 13, and 14. Given a 150 Hz sub-frame frequency and three color changes 10, 11, and 12 per sub-frame, a pulse frequency of 450 Hz results, and the required lamp frequency will be 225 Hz without phantom pulses. Four further phantom pulses P20, P30, P50, and P60 are then an optimum in each lamp cycle in addition to the two anti-flicker pulses P10 and P40, which results in an alternating current frequency of 75 Hz.

A distribution and an angle of the color segments is appliance-dependent and may vary. To improve a red rendering, it is possible to make a red segment considerably larger than the other segments. This causes no problems for a phantom pulse schedule, because the phantom pulses can be freely positioned. It is preferred for the lamp that the longest segment appears after the phase reversal, which is also denoted commutation.

A Buck converter in U.S. Pat. No. 5,608,294 comprises means referenced III which act as a control unit and which are in control of means referenced I and a commutator referenced II. The control unit III can be programmed such that the phantom pulses can be generated in addition to the anti-flicker pulses.

The invention claimed is:

1. A method of representing a video image based on a video signal by means of a projector which comprises an image display device and a high-pressure gas discharge lamp, which lamp is supplied with a square-wave alternating current on which a current pulse is superimposed before each phase reversal, wherein the alternating current is superimposed with a second current pulse of the same polarity.

2. A method as claimed in claim 1, in wherein the second current pulse occurs periodically.

3. A method as claimed in claim 1, in wherein the second current pulse occurs aperiodically.

4. A method as claimed in claim 1, in wherein the second current pulse has the same contour as the current pulse before the phase reversal.

5. A method as claimed in claim 1, in wherein the second current pulse has a pulse duration that can be varied.

6. A method as claimed in claim 1, in wherein the second current pulse has an amplitude that can be varied.

7. A method as claimed in claim 1, in wherein the second current pulse lies within a time period given by the last 80% of the total duration of a half cycle.

8. A method as claimed in claim 1, in wherein the alternating current is synchronized with the video signal.

9. A method as claimed in claim 1, in wherein the second current pulse takes place during a white segment.

10. A method as claimed in claim 1, in wherein the second current pulse occurs during a transition from one color to another.

11. A method as claimed in claim 1, characterized in wherein the frequency of the alternating current can be varied.

12. A projector for a method. as claimed in claim 1.

13. A projector for representing a video image based on a video signal, comprising an image display device and a high-pressure gas discharge lamp, which lamp is supplied with a square-wave alternating current on which a current pulse is superimposed before each phase reversal, characterized in that the alternating current is superimposed with a second current pulse of the same polarity.

14. The method of claim 2, wherein the second current pulse has the same contour as the current pulse before the phase reversal.

15. The method of claim 3, wherein the second current pulse has the same contour as the current pulse before the phase reversal.

16. The method of claim 2, wherein the second current pulse takes place during a white segment.

17. The method of claim 4, wherein the second current pulse takes place during a white segment.

18. The method of claim 4, wherein the second current pulse takes place during a white segment.

19. The method of claim 7, wherein the second current pulse occurs during a transition from one color to another.

20. The method of claim 1, wherein the second current pulse is superimposed to occur one sixth of a lamp cycle prior to the current pulse before the phase reversal.

* * * * *